United States Patent
Kouda et al.

(10) Patent No.: US 6,995,492 B1
(45) Date of Patent: Feb. 7, 2006

(54) ELECTRIC ROTARY MACHINE EQUIPPED WITH STATOR COIL CONSISTING OF SEQUENTIALLY CONNECTED CONDUCTOR SEGMENTS

(75) Inventors: Shinji Kouda, Kariya (JP); Masahiro Seguchi, Oobu (JP)

(73) Assignee: Denso Corporation, Kariya (JP)

( * ) Notice: Subject to any disclaimer, the term of this patent is extended or adjusted under 35 U.S.C. 154(b) by 33 days.

(21) Appl. No.: 10/614,278

(22) Filed: Jul. 8, 2003

(30) Foreign Application Priority Data

Jul. 12, 2002 (JP) .............................. 2002-204760

(51) Int. Cl.
 *H02K 1/12* (2006.01)

(52) U.S. Cl. .................. 310/254; 310/179; 310/184; 310/201

(58) Field of Classification Search ................ 310/254, 310/179, 180, 184, 201, 202, 206, 207, 208
See application file for complete search history.

(56) References Cited

U.S. PATENT DOCUMENTS

| | | | |
|---|---|---|---|
| 6,201,332 B1 * | 3/2001 | Umeda et al. | 310/184 |
| 6,204,586 B1 * | 3/2001 | Umeda et al. | 310/179 |
| 6,291,918 B1 * | 9/2001 | Umeda et al. | 310/215 |
| 6,333,573 B1 * | 12/2001 | Nakamura | 310/45 |
| 6,373,163 B1 | 4/2002 | Oohashi et al. | |
| 6,492,757 B2 * | 12/2002 | Nakamura et al. | 310/180 |
| 6,498,414 B2 * | 12/2002 | Asao | 310/184 |
| 6,501,205 B1 * | 12/2002 | Asao et al. | 310/184 |
| 6,504,283 B1 * | 1/2003 | Asao et al. | 310/254 |
| 6,552,463 B2 * | 4/2003 | Oohashi et al. | 310/207 |
| 6,557,239 B2 * | 5/2003 | Takahashi et al. | 29/596 |

FOREIGN PATENT DOCUMENTS

| | | |
|---|---|---|
| JP | A 11-164506 | 6/1999 |
| JP | A 11-346448 | 12/1999 |
| JP | A 2000-92766 | 3/2000 |
| JP | A 2000-228852 | 8/2000 |
| JP | B1 3155534 | 2/2001 |
| JP | A 2002-58189 | 2/2002 |

* cited by examiner

*Primary Examiner*—Thanh Lam
(74) *Attorney, Agent, or Firm*—Oliff & Berridge, PLC

(57) ABSTRACT

Three partial coils are accommodated in inphase slots arranged successively in the circumferential direction and also accommodated in the same conductor accommodation position set. Each layer coil is constituted by serially connecting these partial coils. Respective layer coils are connected in parallel to each other to form a phase winding.

7 Claims, 10 Drawing Sheets

(PART OF U-PHASE WINDING)

ELECTRIC ROTARY MACHINE EQUIPPED WITH STATOR COIL CONSISTING OF SEQUENTIALLY CONNECTED CONDUCTOR SEGMENTS

BACKGROUND OF THE INVENTION

This invention relates to an electric rotary machine equipped with a stator coil including sequentially connected conductor segments (which is also referred to as "serial-joint segmental stator coil", in the following description), which is preferably applicable to an automotive vehicle.

According to the idle stop system recently employed for automotive engines, the engine is frequently required to stop and restart. Large current is required for restarting the engine. Thus, for the idle stop system, using an excellent starter motor capable of surely supplying large current is essentially important.

In this respect, a serial-joint segmental stator coil is simple in the wiring arrangement at its coil end, large in the slot space factor, compact in the size, and light in the weight. Accordingly, the serial-joint segmental stator coil has excellent heat radiation properties and is preferably employable in an alternating-current motor supplying large current to frequently restart the engine.

Enlarging the cross-sectional area of a conductor segment in the stator coil is effective in increasing the current flowing in an electric rotary machine. However, difficulty in bending the conductor segment will limit the increase in the cross-sectional area of a conductor segment.

Meanwhile, to increase the output of an automotive electric rotary machine and also reduce the wiring loss in this machine, not only increasing the current but also increasing the voltage will be necessary. In other words, the turn number of the coil will be increased inevitably.

SUMMARY OF THE INVENTION

In view of the foregoing problems of the prior arts, an object of the present invention is to provide a stator coil preferably used for a starter motor or a comparable electric rotary machine which is operable under high current/voltage power sources.

To this end, the present invention provides a stator coil including sequentially connected conductor segments for an electric rotary machine which is capable of simplifying the connection pattern of conductor segments.

Furthermore, the present invention provides a stator coil having a parallel circuit arrangement capable of suppressing variation in the electromotive force occurring between parallel circuits.

To accomplish the above and other related objects, the present invention provides an electric rotary machine equipped with a stator coil including sequentially connected conductor segments, including a rotor having P pairs of magnetic poles, a stator core with a plurality of slots each having a plurality of conductor accommodation positions sequentially aligned in a radial direction, and M-phase windings, where M is an odd number not less than 3, each phase winding being constituted by sequentially connecting a plurality of U-shaped conductor segments. The conductor segment includes a pair of in-slot conductor portions separately accommodated into two different slots mutually spaced by a predetermined slot pitch, a U-shaped head portion continuously extending from the in-slot conductor portions and protruding from one end of the stator core so as to constitute a head side coil end, and a pair of tail conductor portions continuously extending from the in-slot conductor portions and protruding from the other end of the stator so as to constitute a tail side coil end. The paired tail conductor portions have distal ends being bonded to distal ends of tail conductor portions of other conductor segment. According to the electric rotary machine of the present invention, K inphase slots arranged successively in a circumferential direction cooperatively constitute an inphase slot group, each inphase slot accommodating the in-slot conductor portions constituting the same phase winding, where K is a natural number not smaller than 2. The slot includes S conductor accommodation position sets, each conductor accommodation position set including 1st-layer to 4th-layer conductor accommodation positions being numbered from a radially inner side and sequentially aligned in a radial direction. The phase winding includes C (=S/T) parallel coils connected in parallel to each other, each parallel coil including T (T is a natural number including 1) layer coils connected in series and selected from S layer coils accommodated in respective conductor accommodation position sets. The S layer coils are accommodated in respective conductor accommodation position sets and constituted by serially connecting K partial coils accommodated in the inphase slots arrange successively in the circumferential direction and accommodated in the same conductor accommodation position set.

According to the electric rotary machine of the present invention, K partial coils are serially connected to constitute each layer coil. The K partial coils are accommodated in the same conductor accommodation position set and accommodated in a plurality of inphase slots arranged successively in the circumferential direction. Thus, the layer coils are provided separately for respective conductor accommodation position sets. Furthermore, a total of S layer coils being thus formed is divided into C(=S/T) layer coil groups. T layer coils included in each layer coil group are connected in series, thereby letting this layer coil group serve as a parallel coil. Furthermore, C parallel coils are connected in parallel to each other to constitute a phase winding.

According to this arrangement, respective layer coil groups (i.e., parallel coils) are subjected to the same magnetic flux. Accordingly, it becomes possible to suppress variation in the electromotive force occurring between parallel circuits.

Serial connection or parallel connection of a plurality of layer coils constituting the same layer coil group (i.e., parallel coil) as well as parallel connection of the parallel coils can be easily accomplished by connecting leader lines of the layer coils. The connection between the layer coils can be easily done by using a radial joint conductor segment having a pair of in-slot conductor portions accommodated separately in a conductor accommodation position of two conductor accommodation position sets disposed adjacently in the radial direction. When the radial joint conductor segment serves as a leader line of a parallel coil, it is preferable that an insulating film covering the head portion of the radial joint conductor segment is partly removed for terminal connection.

Furthermore, the layer coil is constituted by serially connecting all of the partial coils separately accommodated in K inphase slots arranged successively in the circumferential direction. The serial connection between the partial coils can be easily accomplished by connecting leader lines of the partial coils. Furthermore, the connection of the partial coils can be easily done by using a circumferential joint conductor segment having a pair of in-slot conductor portions accommodated separately in a conductor accommodation position of two inphase slots disposed adjacently in the radial direction.

Furthermore, according to this invention, the maximum electric potential difference between respective in-slot conductor portions in the same slot becomes small. This improves the reliability in the insulation between the in-slot conductor portions.

As a result, the present invention provides an electric rotary machine with a serial-joint segmental stator coil which is preferably employable in large current and/or voltage devices or facilities. Using the circumferential joint conductor segment and the radial joint conductor segment makes it possible to simplify the connection between the partial coils and the connection between the layer coils. The entire wiring distance becomes short. The resistance loss and heat generation can be suppressed. The axial length of the coil end can be shortened. The electric rotary machine can be downsized.

In short, the serial-joint segmental stator coil of the present invention has a simple structure with a plurality of partial coils arranged regularly when seen in a cross section taken along the radial direction of the stator core. These partial coils are successively connected in the circumferential direction and in the radial direction to constitute a phase winding with partial coils being formed by serial/parallel connection circuits. Thus, it becomes possible to employ the serial-joint segmental stator coil for the large current and/or voltage devices or facilities. The layout of connection wires between the partial coils is simple. Mutual interference between the connection wires can be easily suppressed. As a result, the space for the connection wires can be reduced. Size and weight of the electric rotary machine can be reduced. Furthermore, the resistance loss and heat generation of the connection wires can be suppressed.

Accordingly, the serial-joint segmental stator coil type electric rotary machine in accordance with the present invention is preferably employed in a vehicle installing a high-voltage battery which is, for example, a 42V-type battery having a higher output voltage level compared with that (e.g., 14V) of a conventional battery. Furthermore, the serial-joint segmental stator coil of the present invention can be easily modified for the use in the conventional 14V-type automotive electric rotary machine by changing the three partial coils constituting the parallel coil (i.e., layer coil) of the phase winding from serial connection to parallel connection.

According to a preferred embodiment of the present invention, the partial coil includes first and second circulation coils and a modified wave winding conductor segment. The first and second circulation coils are constituted by alternately connecting a wave winding conductor segment inserted into 1st-layer and 4th-layer conductor accommodation positions and a lap winding conductor segment inserted into 2nd-layer and 3rd-layer conductor accommodation positions. The modified wave winding conductor segment connects the first and second circulation coils and constitutes a trailing in-slot conductor portion of the first circulation coil and a leading in-slot conductor portion of the second circulation coil. The layer coil is constituted by K partial coils accommodated respectively in K inphase slots arranged consecutively in the circumferential direction and serially connected by circumferential joint conductor segments. And, the circumferential joint conductor segment constitutes a leading in-slot conductor portion of one of serially connected partial coils and a trailing in-slot conductor portion of the other of serially connected partial coils.

With this arrangement, it becomes possible to simply connect four in-slot conductor portions successively disposed in the radial direction in the same slot. It becomes possible to easily dispose numerous inphase slots which are a predetermined number of slots sequentially disposed in the circumferential direction for accommodating the same phase winding. The coil end structure can be simplified while the turn number of the partial coils can be increased.

According to the preferred embodiment of the present invention, S is equal to C. This is advantageous in that the parallel coils can be formed by the same number as that of the layer coils aligned in the radial direction.

According to the preferred embodiment of the present invention, the stator coil further includes a radial joint conductor segment having a pair of in-slot conductor portions separately accommodated in two adjacent sets of the conductor accommodation position sets and accommodated in the inphase slot having the same order in the circumferential direction. The radial joint conductor segment is connected to a leader line of the parallel coil. The pair of in-slot conductor portions of the radial joint conductor segment constitutes a leading or trailing in-slot conductor portion of two layer coils disposed adjacently in the radial direction.

With this arrangement, the parallel connection of respective parallel coils can be accomplished by using the short leader lines. In this case, the leader line is a wiring connected to an external or neutral point according to the star-connected wiring or a wiring for interphase connection according to the Δ connection.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

Hereinafter, an electric rotary machine having a stator coil including sequentially connected conductor segments (hereinafter, referred to as a serial-joint segmental stator coil) in accordance with the present invention will be explained with reference to the attached drawings.

Overall Arrangement

Figure 1:
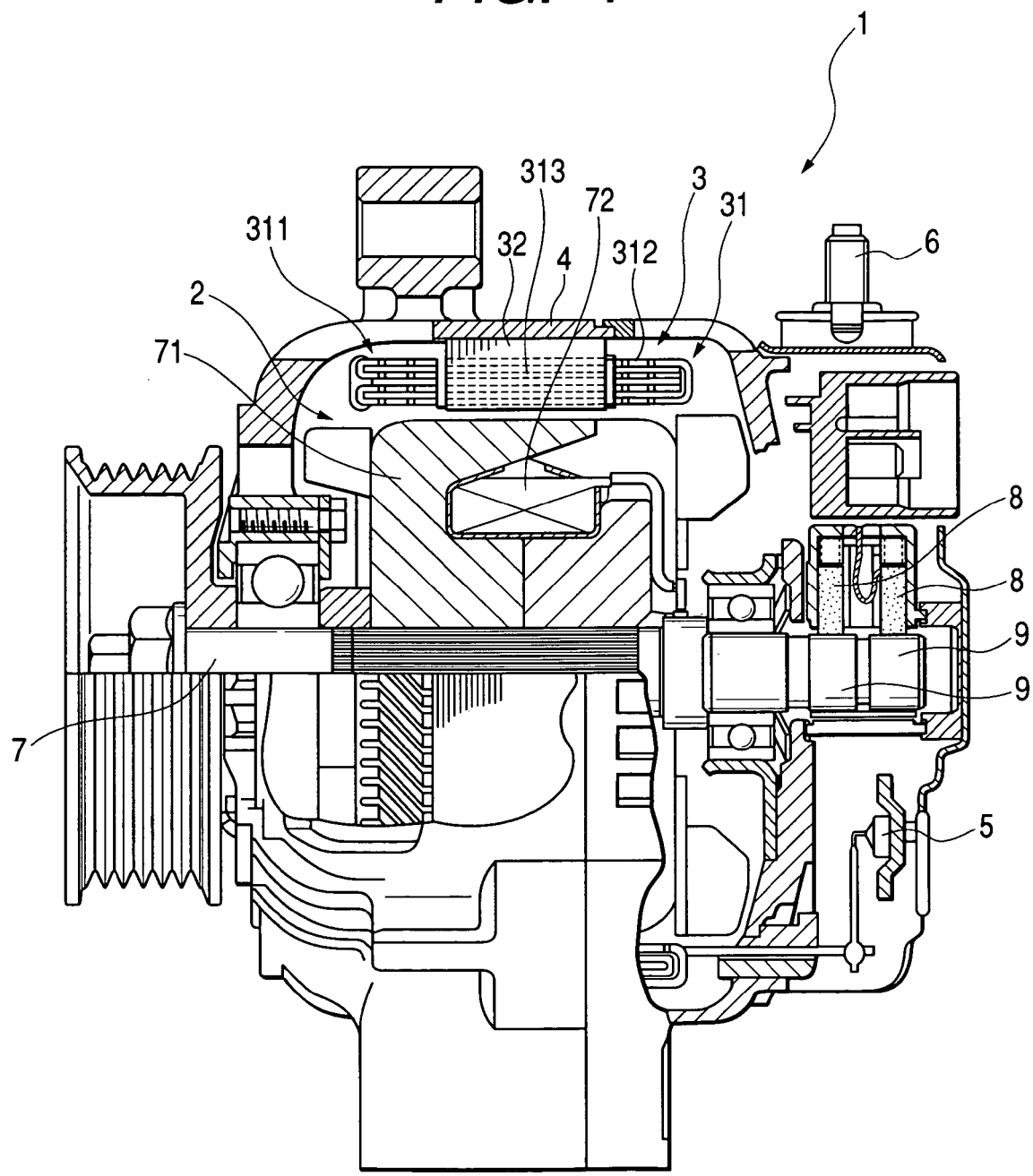
FIG. 1 is a vertical cross-sectional view showing an automotive electric rotary machine equipped with a serial-joint segmental stator coil in accordance with a preferred embodiment of the present invention.
Figure 2:
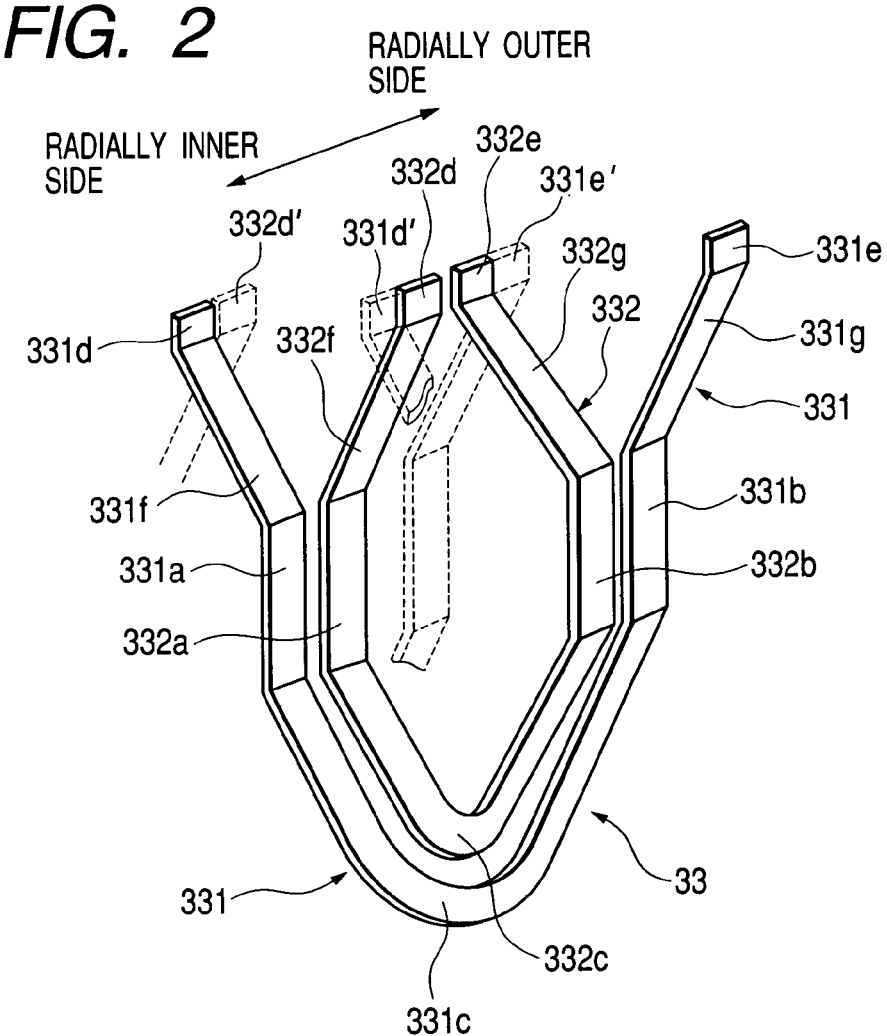
FIG. 2 is a perspective view schematically showing a conductor segment set in accordance with the preferred embodiment of the present invention.
Figure 3:
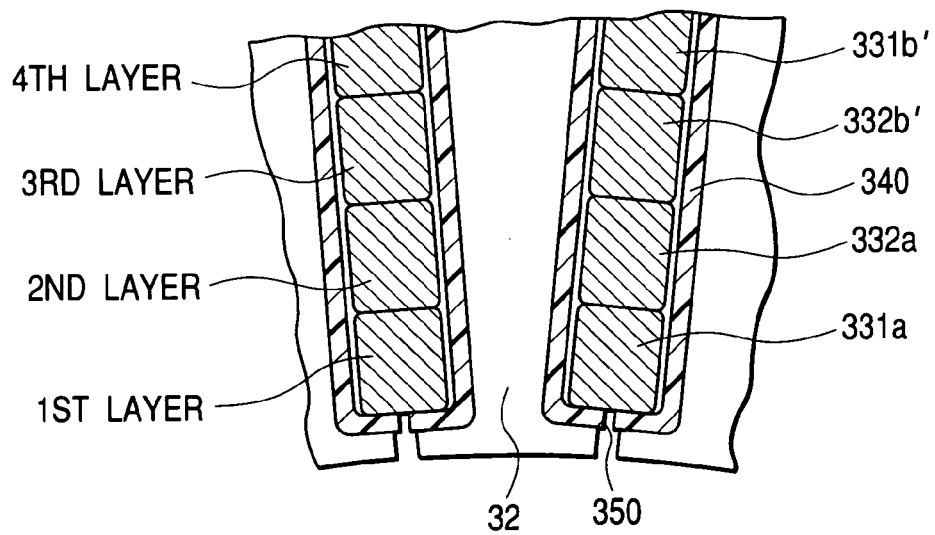
FIG. 3 is a cross-sectional view partially showing conductor segments installed in a slot of a stator core in accordance with the preferred embodiment of the present invention.

As shown in FIG. 1, an electric rotary machine 1 is an automotive alternator including a rotor 2, a stator 3, a housing 4, a rectifier 5, an output terminal 6, a rotary shaft 7, a brush 8, and a slip ring 9. The stator 3 consists of a stator coil 31 and a stator core 32. The stator core 32 is fixed on an inner cylindrical wall of the housing 4. The stator coil 31 is wound in slots of the stator core 32. The rotor 2 is a Lundel-pole type rotor fixed to the rotary shaft 7. The rotary shaft 7 is rotatably supported inside the housing 4. The rotor 2 is disposed radially inside the stator core 32. The stator coil 31 is a three-phase armature winding. A conductor segment set 33 shown in FIG. 2 is inserted into slots 350 of the stator core 32 from one axial end of the stator core 32. As shown in FIG. 3, an insulation paper 340 is provided in each slot 350 to electrically insulate the conductor segment set 33 from the stator core 32. The tail ends of each conductor segment set 33 are sequentially connected to tail ends of neighboring conductor segment sets 33 at the other axial end of the stator core 32. The stator coil 31 constitutes a head side coil end 311 at the above one axial end of the stator core 32 and a tail side coil end 312 at the other axial end of the stator core 32. This coil arrangement is referred to as a serial-joint segmental stator coil.

Explanation of Conductor Segment Set 33

Each conductor segment set 33, inserted into the slots of the stator core 32 from one side, extends in the slot and protrudes out of the stator core 32 from the other side. The protruding portion of the conductor segment set 33, having a predetermined length, is twisted in the circumferential direction by an amount equivalent to an electric angle of π/2. The protruding portions of conductor segment sets 33 are welded at their distal ends (i.e., joint portions) according to predetermined combinations. Each conductor segment set 33 has an elongated plate body configured as a whole into U shape which is sheathed by a resin film except the distal ends of the protruding portions, i.e., except the distal end portions to be welded. This kind of stator coil itself, as characterized by sequentially connected conductor segments, is already known.

The detailed arrangement of conductor segment set 33 is explained hereinafter.

Each conductor segment set 33 consists of a large conductor segment 331 and a small conductor segment 332, each including a substantially U- or V-shaped head conductor portion, a pair of in-slot conductor portions, and a pair of protruding tail conductor portions. The in-slot conductor portions extend straight from bifurcated ends of the head conductor portion and are accommodated in slots. The protruding tail conductor portions extend outward from the corresponding in-slot conductor portions.

In other words, the stator coil 31 consists of a first coil end portion (i.e., head side coil end) 311, a second coil end portion (i.e., tail side coil end) 312, and the in-slot conductor portion. The first coil end portion 311, formed as a whole into a ring shape, is disposed at one axial side of the stator core 32. The second coil end portion 312, formed as a whole into a ring shape, is disposed at the other axial side of the stator core 32. The in-slot conductor portion is disposed in the slot of the stator core 32.

Namely, in FIG. 1, the head side coil end 311 is constituted by the head conductor portions of respective conductor segment sets 33, while the tail side coil end 312 is constituted by the protruding tail conductor portions of respective conductor segment sets 33.

The conductor segment set 33 includes a large conductor segment 331 (which may be referred to as a large-turning conductor segment) and a small conductor segment 332 (which may be referred to as a small-turning conductor segment). The large conductor segment 331 surrounds the small conductor segment 332. The large conductor segment 331 and the small conductor segment 332 are collectively referred to as a segment set.

The large conductor segment 331 consists of a head conductor portion 331c, a pair of in-slot conductor portions 331a and 331b, and a pair of tail conductor portions 33 if and 331g. The tail conductor portions 331f and 331g have distal ends 33 id and 33 le which are portions to be welded. In this respect, the distal ends 331d and 331e can be also referred to as edge portions or joint portions. The in-slot conductor portion 331a is positioned in the innermost layer and accordingly may be referred to as the in-slot conductor portion of the first layer. The in-slot conductor portion 331b is positioned in the outermost layer and accordingly may be referred to as the in-slot conductor portion of the fourth layer.

The small conductor segment 332 consists of a head conductor portion 332c, a pair of in-slot conductor portions 332a and 332b, and a pair of tail conductor portions 332f and 332g. The tail conductor portions 332f and 332g have distal ends 332d and 332e which are portions to be welded. In this respect, the distal ends 332d and 332e can be also referred to as edge portions or joint portions. The in-slot conductor portion 332a is positioned in the inner middle layer and accordingly may be referred to as the in-slot conductor portion of the second layer. The in-slot conductor portion 332b is positioned in the outer middle layer and accordingly may be referred to as the in-slot conductor portion of the third layer.

Regarding the symbol ' attached to the number in the drawing, it means that a portion accompanied by the symbol ' is identical with the portion denoted by the same reference numeral. Accordingly, in FIG. 2, the joint portions 331d and 332d', which are aligned next to each other in the radial direction, are welded together. Similarly, the joint portions 332d and 331d', which are aligned next to each other in the radial direction, are welded together. The joint portions 332e and 331e', which are aligned next to each other in the radial direction, are welded together.

According to FIG. 2, the in-slot conductor portion 331a of the first layer and the in-slot conductor portion 332a of the second layer are accommodated in a predetermined slot of the stator core 32. In this case, the other in-slot conductor portion 331b of the conductor segment 331, positioned in the fourth layer, is accommodated in a different slot which is angularly offset from that of the in-slot conductor portion 331a by an amount equivalent to a predetermined number of pole pitch (e.g., one magnetic pole pitch (=electric angle of π)). The other in-slot conductor portion 332b of the conductor segment 332, positioned in the third layer, is accommodated in the same slot as that of the in-slot conductor portion 331b of the conductor segment 331. The head conductor portion 331c of the large conductor segment 331 surrounds the head conductor portion 332c of the small conductor segment 332 in the condition where the conductor segments 331 and 332 are disposed in the slots of stator core 32.

The large conductor segment 331 serves as a wave winding conductor segment, while the small conductor segment 332 serves as a lap winding conductor segment.

Layout of Segment Set in a Slot

FIG. 3 shows the layout of the in-slot conductor portions of the segment sets accommodated in the slots 350 of stator core 32.

Each slot 350 has a total of 4×S (e.g., S=4) conductor accommodation positions aligned in the radial direction. Four consecutive conductor accommodation positions aligned in the radial direction are referred to as a conductor accommodation position set. One conductor accommodation position set consists of 1st-layer, 2nd-layer, 3rd-layer, and 4th-layer conductor accommodation positions which are numbered from the radially inner side. Four in-slot conductor portions 331a, 332a, 332b, and 331b of the conductor segment set 33 shown in FIG. 2 are inserted into the 1st-layer to 4th-layer conductor accommodation positions. As a result, each slot 350 accommodates S conductor segment sets arrayed in the radial direction. Two in-slot conductor portions accommodated in the first and fourth layers of the same slot belong to mutually different large conductor segments (i.e., wave winding conductor segments) 331. Two in-slot conductor portions accommodated in the second and third layers of the same slot belong to the same small conductor segment (i.e., lap winding conductor segment) 332.

The in-slot conductor portions 331a, 332a, 332b', and 331b' are aligned in the radial direction and sequentially accommodated in the 1st-layer to 4th-layer conductor accommodation positions of each conductor accommodation position set. More specifically, the in-slot conductor portion 331a of the first layer is disposed at the radially innermost side so as to be accommodated in the 1st-layer conductor accommodation position. The in-slot conductor portion 332a of the second layer is accommodated in the 2nd-layer conductor accommodation position. The in-slot conductor portion 332b' of the third layer is accommodated in the 3rd-layer conductor accommodation position. The in-slot conductor portion 331b' of the fourth layer is accommodated in the 4th-layer conductor accommodation position. In FIG. 3, the in-slot conductor portions 332a and 332b' belong to mutually different small conductor segments 332. The in-slot conductor portions 331a and 331b' belong to mutually different large conductor segments 331.

Figure 4:
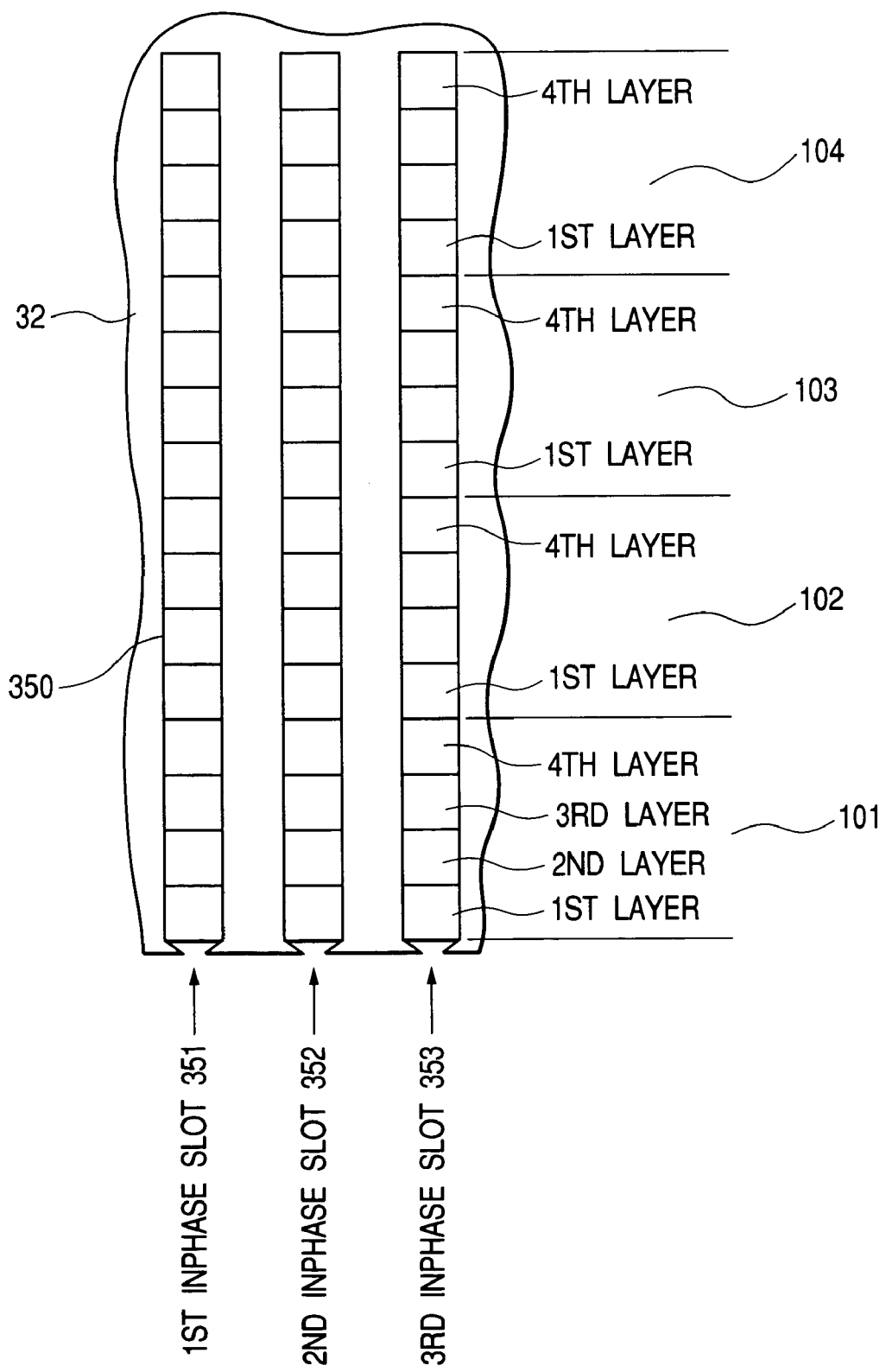
FIG. 4 is a schematic view showing the entire layout of conductor segments in respective slots of a stator core in accordance with the preferred embodiment of the present invention.

In addition to the innermost conductor segment set 33 shown in FIG. 3, each slot 350 accommodates three more conductor segment sets 33 arrayed sequentially in the radial direction as shown in FIG. 4. An inpahse voltage of the same phase is applied to three consecutive slots 351, 352, and 353 arranged successively in the circumferential direction of the stator core 32 (refer to FIG. 4). This embodiment is based on a star-connected three-phase (i.e., U-, V-, and W-phase) windings. Accordingly, when P represents a magnetic pole pair number, the stator core 32 of this embodiment has a total of 18P slots. The consecutive slots 351, 352, and 353 accommodating the inphase windings and successively aligning in the circumferential direction are respectively referred to as an inphase slot and are also collectively referred to as an inphase slot group. The inphase slot 351 is referred to as first inphase slot. The inphase slot 352 is referred to as second inphase slot. The inphase slot 353 is referred to as third inphase slot. Each of the first to third inphase slots 351 to 353 has four conductor accommodation position sets 101, 102, 103, and 104, each including 1st-layer to 4th-layer conductor accommodation positions.

Explanation of Arrangement of Three-phase Stator Coil

Figure 5:
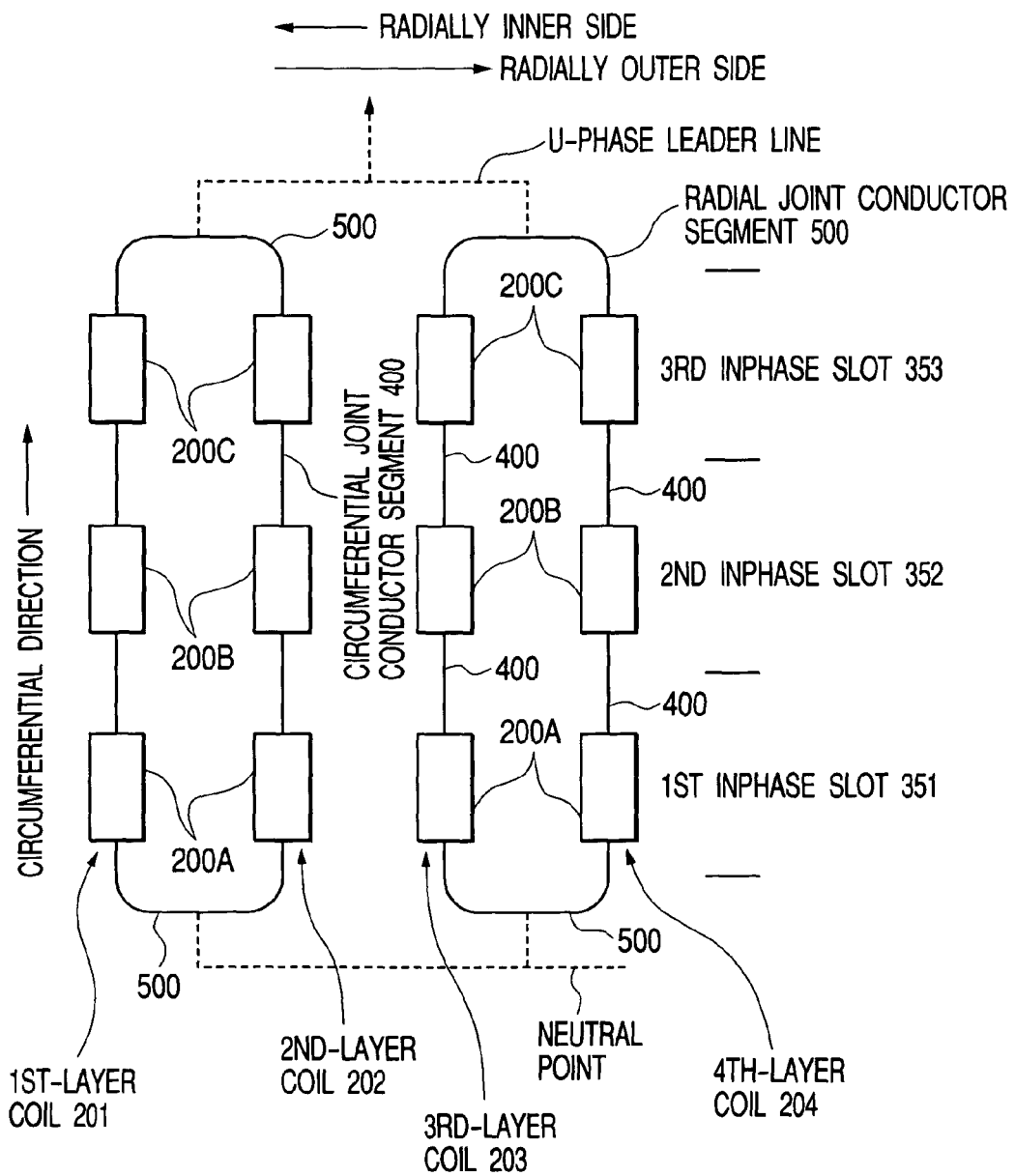
FIG. 5 is a circuit diagram showing a phase winding in accordance with the preferred embodiment of the present invention.

FIG. 5 shows the connection pattern of the U-phase winding constituting part of a star-connected serial-joint segmental stator coil 31 in accordance with this embodiment of the present invention. It is needless to say that V-phase and W-phase windings have the same arrangement although they are shifted in the circumferential direction.

The U-phase winding includes a 1st-layer coil 201, a 2nd-layer coil 202, a 3rd-layer coil 203, and a 4th-layer coil 204 which are connected in parallel with each other via radial joint conductor segments 500. Each of the 1st-layer to 4th-layer coils 201, 202, 203, and 204 consists of three partial coils 200A, 200B, and 200C accommodated in the same conductor accommodation position set which are serially connected via circumferential joint conductor segments 400. The 1st-layer coil 201 is accommodated in the first conductor accommodation position set 101. The 2nd-layer coil 202 is accommodated in the second conductor accommodation position set 102. The 3rd-layer coil 203 is accommodated in the third conductor accommodation position set 103. The 4th-layer coil 204 is accommodated in the fourth conductor accommodation position set 104. In each of the 1st-layer to 4th-layer coils 201, 202, 203, and 204, the partial coils 200A, 200B, and 200C are accommodated in the first, second, and third inphase slots 351, 352, and 353, respectively. The partial coils 200A, 200B, and 200C may be respectively referred to as partial coil 200 and are accommodated at the same conductor accommodation position set. Each of the partial coils 200 is accommodated in an inphase slot having the same order in the circumferential direction in the same inphase slot group. To simplify the drawings, each of FIGS. 1 to 3 shows only one layer coil accommodated in a single conductor accommodation position set.

Figure 6:
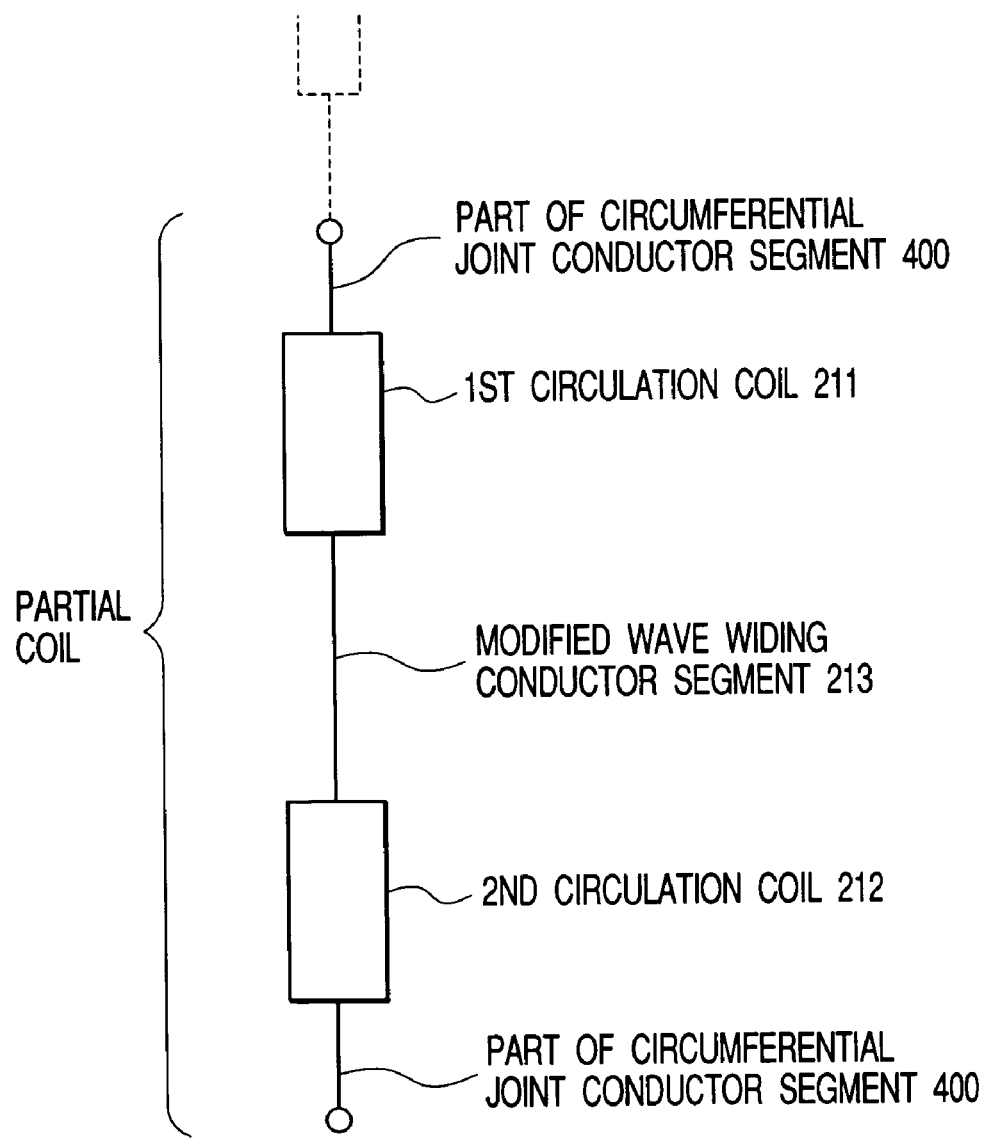
FIG. 6 is a circuit diagram showing a partial coil in accordance with the preferred embodiment of the present invention.
Figure 7:
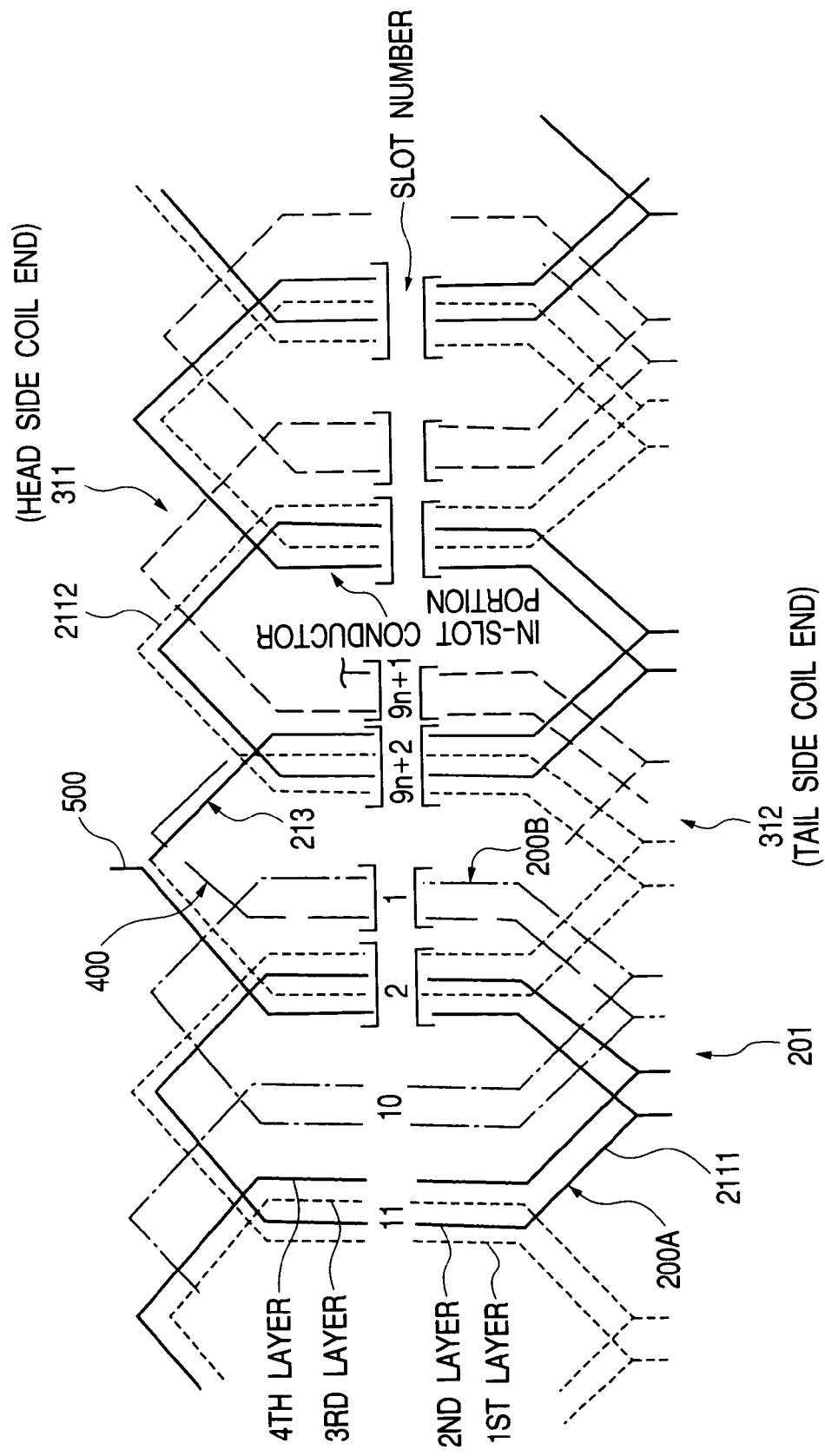
FIG. 7 is a development view showing partial winding of a layer coil in accordance with the preferred embodiment of the present invention.

Each partial coil 200, as shown in FIG. 6, includes a first circulation coil 211 and a second circulation coil 212 connected via a modified wave winding conductor segment 213. The first circulation coil 211 and the second circulation coil 212 are constituted by alternately connecting the wave winding conductor segment and the lap winding conductor segment so as to substantially form one complete cycle or loop as shown in FIG. 7. In this case, the wave winding conductor segment is constituted by the conductor segments having a pair of protruding tail conductor portions inclined far from each other and having the in-slot conductor portions accommodated in the 1st-layer and 4th-layer conductor accommodation positions. The lap winding conductor segment is constituted by the conductor segments having a pair of protruding tail conductor portions inclined close to each other and having the in-slot conductor portions accommodated in the 2nd-layer and 3rd-layer conductor accommodation positions.

It is now assumed, for convenience' sake, that a leading in-slot conductor portion of the first circulation coil 211 of the partial coil 200 is constituted by the in-slot conductor portion of the circumferential joint conductor segment 400, and is also assumed that a trailing slot conductor portion of the second circulation coil 212 of the partial coil 200 is constituted by the in-slot conductor portion of the circumferential joint conductor segment 400.

FIG. 7 is the development of the partial winding of the 1st-layer coil 201. FIG. 7 shows a plurality of slots identified by the slot numbers 1, 2, 10, 11, 9n+1, and 9n+2. The slot numbers 2, 11, and 9n+2 represent the first inphase slot 351. The slot numbers 1, 10, and 9n+1 represent the second inphase slot 352. Due to drawing restrictions, slot numbers 9, 0, and 9n corresponding to the third inphase slot 353 are omitted. Furthermore, each of the first inphase slots 2, 11, and 9n+2 shows a total of four in-slot conductor portions accommodated in four conductor accommodation positions, respectively. However, the second inphase slots 1, 10, and 9n+1 do not completely show all of the four in-slot conductor portions.

Accordingly, FIG. 7 shows the partial coil (which may be referred to as first partial coil) 200A accommodated in the first inphase slot 351 and part of the partial coil (which may be referred to as second partial coil) 200B accommodated in the second inphase slot 352. In other words, FIG. 7 does not show the partial coil (which may be referred to as third partial coil) 200C accommodated in the third inphase slot 353. Four in-slot conductor portions accommodated in the same slot and successively arrayed in the radial direction are depicted as aligning in the right-and-left direction in FIG. 7. In the same slot shown in FIG. 7, the leftmost in-slot conductor portion is the in-slot conductor portion of the first layer and the rightmost in-slot conductor portion is the in-slot conductor portion of the fourth layer.

In FIG. 7, the radial joint conductor segment 500 serving as one end of the 1 st-layer coil 201 is connected to the first circulation coil 211 of the first partial coil 200A surrounding the first inphase slot. Reference numeral 2111 represents an initial lap winding conductor segment of the first circulation coil 211 of the first partial coil 200A. The first circulation coil 211 is constituted by alternately connecting the lap winding conductor segment and the wave winding conductor segment so as to substantially form one complete cycle or loop. The first circulation coil 211 is continuously connected to the modified wave winding conductor segment 213. One in-slot conductor portion of the modified wave winding conductor segment 213 constitutes a trailing in-slot conductor portion of the first circulation coil 211 and a leading in-slot conductor portion of the second circulation coil 212. Reference numeral 2112 represents an initial wave winding conductor segment of the second circulation coil 212 of the first partial coil 200A. The second circulation coil 212 is constituted by alternately connecting the lap winding conductor segment and the wave winding conductor segment so as to substantially form one complete cycle or loop. The second circulation coil 212 is continuously connected to the circumferential joint conductor segment 400.

The circumferential joint conductor segment 400, being a modified wave winding conductor segment 213, is connected to the first circulation coil, the modified wave winding conductor segment, the second circulation coil, and the circumferential joint conductor segment of the second partial coil 200B. This circumferential joint conductor segment 400 is connected to the first circulation coil, the modified wave winding conductor segment, the second circulation coil, and the circumferential joint conductor segment of the third partial coil 200C. The circumferential joint conductor segment of the third partial coil 200C is connected to a leader line.

As shown in FIG. 7, a pair of protruding tail conductor portions of the modified wave winding conductor segment 213 inclines rightward. A pair of protruding tail conductor portions of the circumferential joint conductor segment 500 inclines leftward. With the above-described arrangement, the 1 st-layer coil 201 is accomplished. The 2nd-layer to 4th-layer coils 202 to 204 are formed in the same manner.

Figure 8:
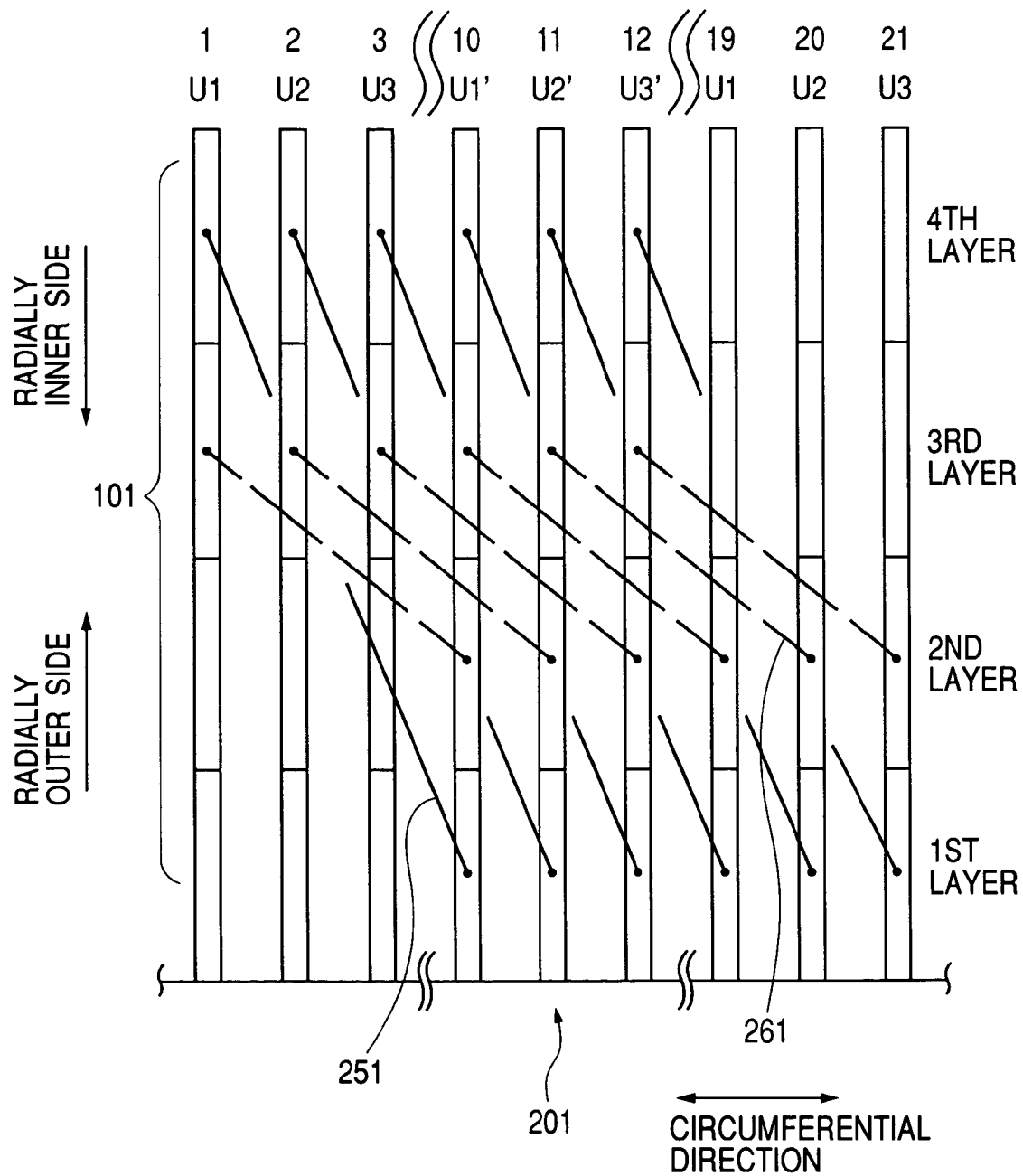
FIG. 8 is a view showing a head side coil end of a layer coil in accordance with the preferred embodiment of the present invention.
Figure 9:
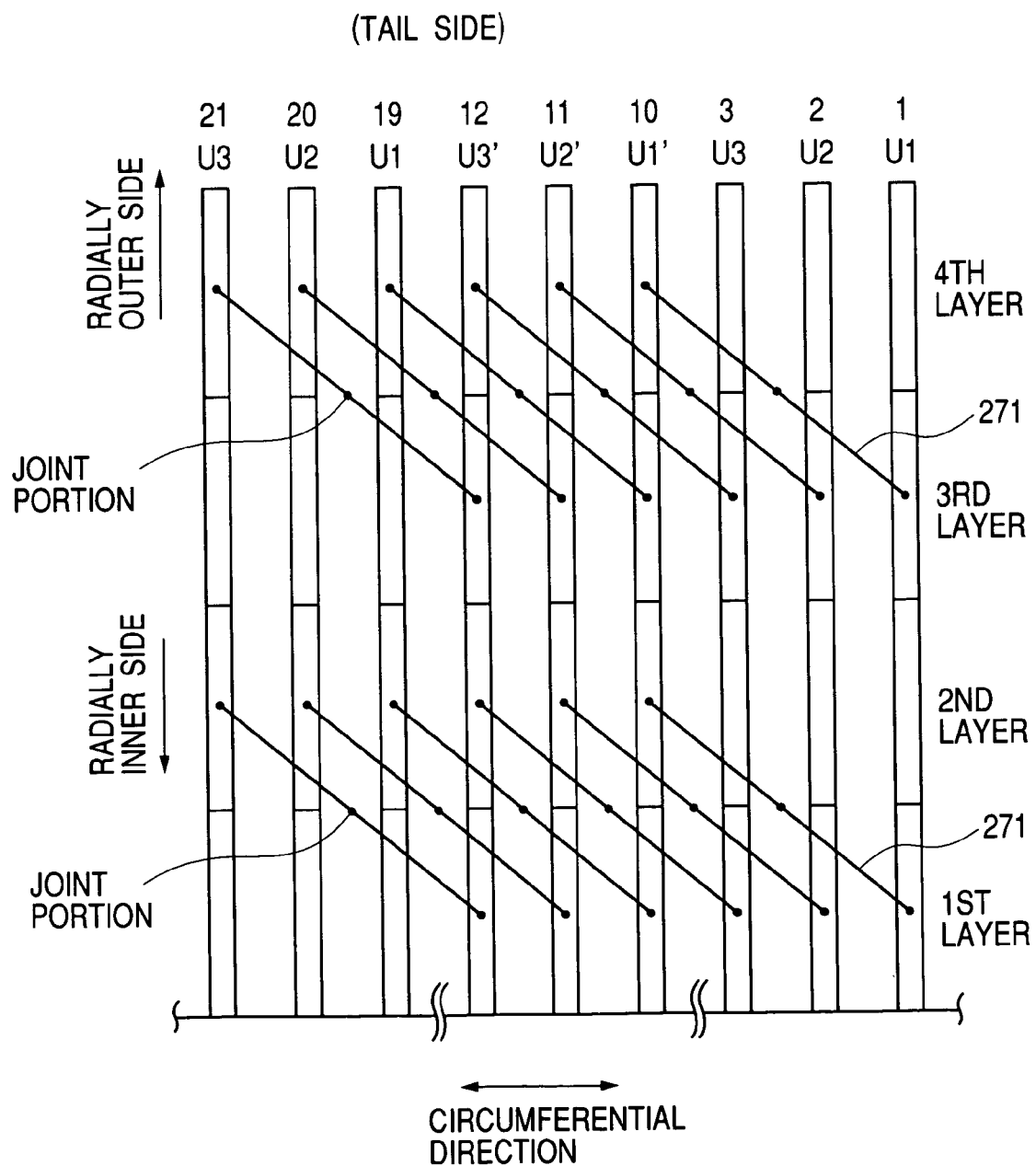
FIG. 9 is a view showing a tail side coil end of a layer coil in accordance with the preferred embodiment of the present invention.

FIG. 8 shows part of the head side coil end 311 of the 1 st-layer coil 201. FIG. 9 shows part of the tail side coil end 312 of the 1st-layer coil 201. Reference numeral 251 represents a head portion of the wave winding conductor segment. Reference numeral 261 represents a head portion of the lap winding conductor segment. Reference numeral 271 represents a joint portion of protruding tail conductor portions of the tail side coil end 312.

Figure 10:
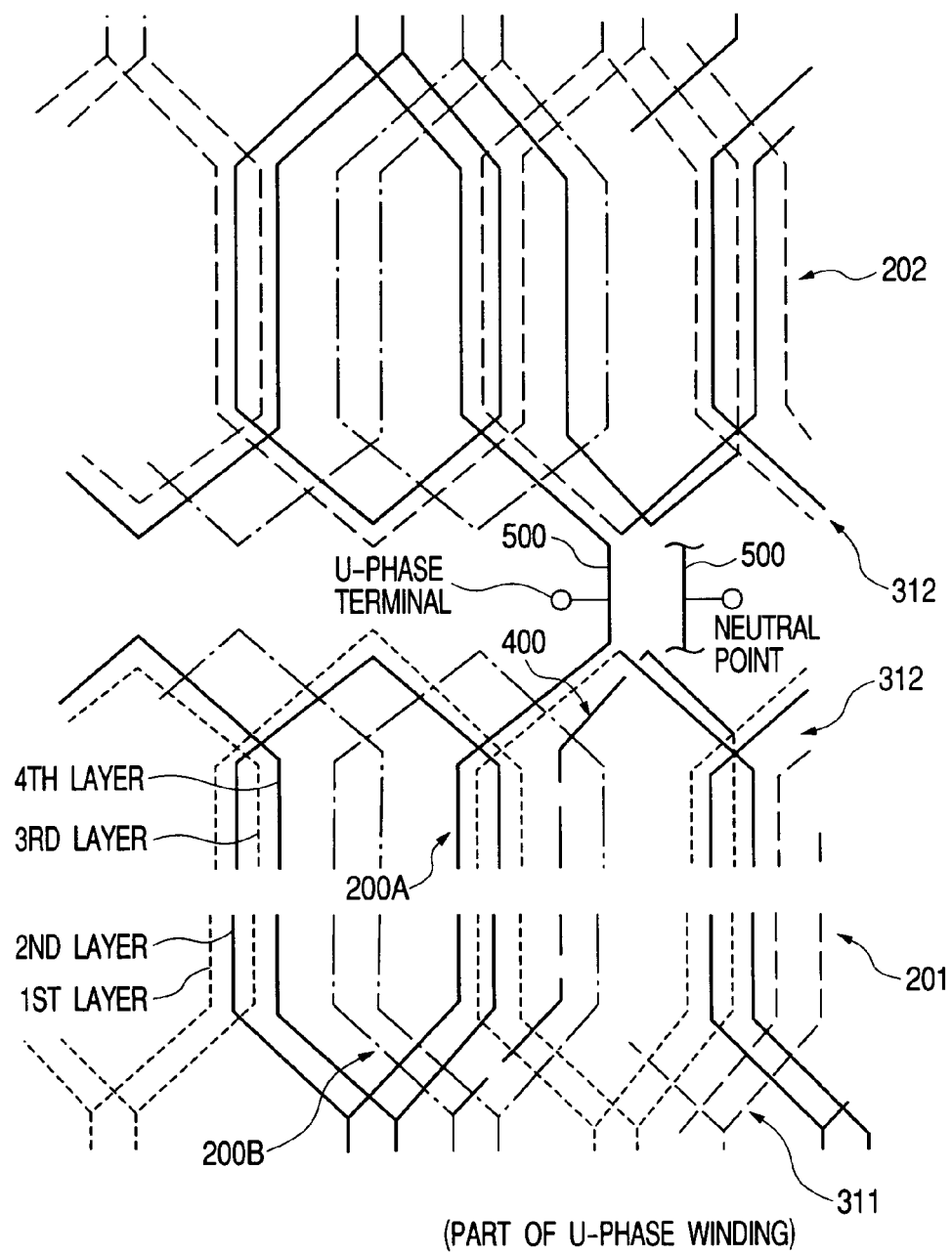
FIG. 10 is a development showing partial winding of two layer coils connected in parallel to each other in accordance with the preferred embodiment of the present invention.
Figure 11:
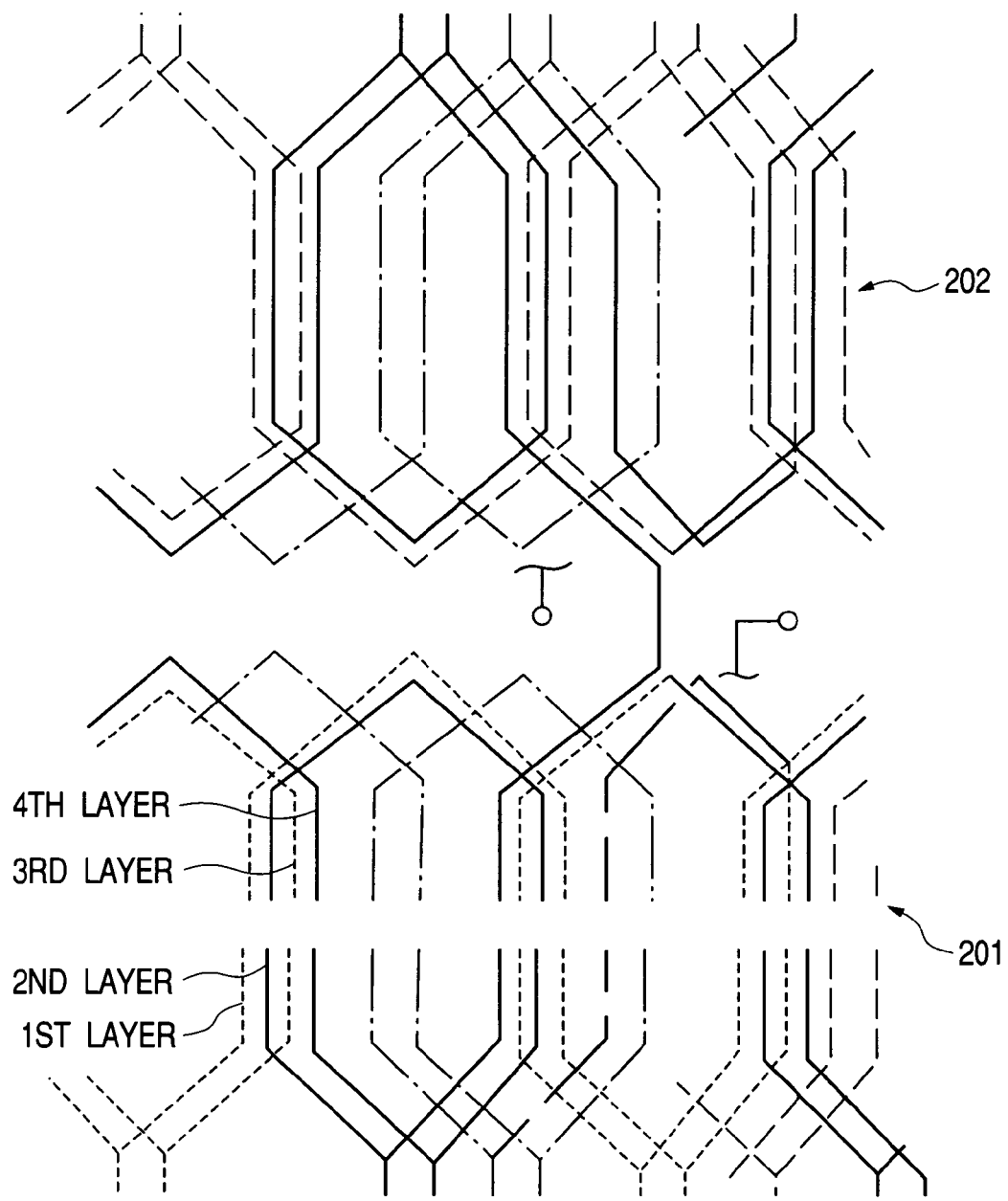
FIG. 11 is a development showing partial winding of two layer coils connected in series in accordance with the preferred embodiment of the present invention.

FIG. 10 is the development of the partial winding of the 1 st-layer coil 201 and the 2nd-layer coil 202 connected in parallel with each other. FIG. 11 is the development of the partial winding of the 1 st-layer coil 201 and the 2nd-layer coil 202 connected in series. As apparent from FIGS. 10 and 11, the wiring connection according to this embodiment provides a simple head side coil end structure and makes it possible to realize a serial-joint segmental stator coil type electric rotary machine capable of flowing a great amount of current with coils of large turn number.

According to the above-described embodiment, the circumferential joint conductor segment 400 and the radial joint conductor segment 500 are used for connecting the partial coils 200 in series or parallel to each other and for forming a neutral point or a leader line of the phase terminal. Thus, it becomes possible to simplify the structure of the head side coil end 311, and to realize a parallel circuit.

What is claimed is:

1. An electric rotary machine equipped with a stator coil including sequentially-connected conductor segments, comprising:
   a rotor having P pairs of magnetic poles;
   a stator core with a plurality of slots, each slot having a plurality of conductor accommodation positions sequentially aligned in a radial direction;
   M-phase windings, where M is an odd number not less than 3, each phase winding being constituted by sequentially connecting a plurality of U-shaped conductor segments;
   said conductor segment comprising a pair of in-slot conductor portions separately accommodated into two different slots mutually spaced by a predetermined slot pitch, a U-shaped head portion continuously extending from said in-slot conductor portions and protruding from one end of said stator core so as to constitute a head side coil end, and a pair of tail conductor portions continuously extending from said in-slot conductor portions and protruding from the other end of said stator so as to constitute a tail side coil end; and
   said pair of tail conductor portions having distal ends being bonded to distal ends of tail conductor portions of other conductor segment,
   wherein K inphase slots arranged successively in a circumferential direction cooperatively constitute an inphase slot group, each inphase slot accommodating the in-slot conductor portions constituting the same phase winding, where K is a natural number not smaller than 2, said slot comprises S conductor accommodation position sets, each conductor accommodation position set including 1st-layer to 4th-layer conductor accommodation positions being numbered from a radially inner side and sequentially aligned in a radial direction, and said phase winding comprises C(=S/T) parallel coils connected in parallel to each other, each parallel coil including T (T is a natural number including 1) layer coils connected in series and selected from S layer coils accommodated in respective conductor accommodation position sets, said S layer coils being accommodated in respective conductor accommodation position sets and constituted by serially connecting K partial coils accommodated in said inphase slots arranged successively in the circumferential direction and accommodated in the same conductor accommodation position set.

2. The electric rotary machine equipped with a stator coil including sequentially-connected conductor segments in accordance with claim 1, wherein said partial coil comprises first and second circulation coils and a modified wave winding conductor segment, said first and second circulation coils are constituted by alternately connecting a wave winding conductor segment inserted into 1 st-layer and 4th-layer conductor accommodation positions and a lap winding conductor segment inserted into 2nd-layer and 3rd-layer conductor accommodation positions, and said modified wave winding conductor segment connects said first and second circulation coils and constitutes a trailing in-slot conductor portion of said first circulation coil and a leading in-slot conductor portion of said second circulation coil, said layer coil is constituted by K partial coils accommodated respectively in K inphase slots arranged consecutively in the circumferential direction and serially connected by circumferential joint conductor segments, and said circumferential joint conductor segment constitutes a leading in-slot conductor portion of one of serially connected partial coils and a trailing in-slot conductor portion of the other of serially connected partial coils.

3. The electric rotary machine equipped with a stator coil including sequentially-connected conductor segments in accordance with claim 1, wherein S is equal to C.

4. The electric rotary machine equipped with a stator coil including sequentially-connected conductor segments in accordance with claim 3, further comprising a radial joint conductor segment having a pair of in-slot conductor portions separately accommodated in two adjacent sets of said conductor accommodation position sets and accommodated in the inphase slot having the same order in the circumferential direction, and said radial joint conductor segment being connected to a leader line of said parallel coil, wherein the pair of in-slot conductor portions of said radial joint conductor segment constitutes a leading or trailing in-slot conductor portion of two layer coils disposed adjacently in the radial direction.

5. The electric rotary machine equipped with a stator coil including sequentially-connected conductor segments in accordance with claim 2, wherein the first and second circulation coils are connected in series.

6. The electric rotary machine equipped with a stator coil including sequentially-connected conductor segments in accordance with claim 2, wherein the first and second circulation coils are connected in parallel.

7. An electric rotary machine equipped with a stator coil including sequentially-connected conductor segments, comprising:

a rotor having P pairs of magnetic poles;

a stator core with a plurality of slots, each slot having a plurality of conductor accommodation positions sequentially aligned in a radial direction;

M-phase windings, where M is an odd number not less than 3, each phase winding being constituted by sequentially connecting a plurality of U-shaped conductor segments;

said conductor segment comprising a pair of in-slot conductor portions separately accommodated into two different slots mutually spaced by a predetermined slot pitch, a U-shaped head portion continuously extending from said in-slot conductor portions and protruding from one end of said stator core so as to constitute a head side coil end, and a pair of tail conductor portions continuously extending from said in-slot conductor portions and protruding from the other end of said stator so as to constitute a tail side coil end; and said pair of tail conductor portions having distal ends being bonded to distal ends of tail conductor portions of other conductor segment, wherein K inphase slots arranged successively in a circumferential direction cooperatively constitute an inphase slot group, each inphase slot accommodating the in-slot conductor portions constituting the same phase winding, where K is a natural number not smaller than 2, said slot comprises S conductor accommodation position sets, each conductor accommodation position set including 1 st-layer to 4th-layer conductor accommodation positions being numbered from a radially inner side and sequentially aligned in a radial direction, said phase winding comprises C (=S/T) parallel coils connected in parallel to each other, each parallel coil including T (T is a natural number including 1) layer coils connected in series and selected from S layer coils accommodated in respective conductor accommodation position sets, said S layer coils being accommodated in respective conductor accommodation position sets and constituted by serially connecting K partial coils accommodated in said inphase slots arranged successively in the circumferential direction and accommodated in the same conductor accommodation position set, and said partial coils comprise parallel connected first and second circulation coils and a modified wave winding conductor segment.

* * * * *